United States Patent [19]
Goto

[11] Patent Number: 5,444,565
[45] Date of Patent: Aug. 22, 1995

[54] OPTICAL SCANNER

[75] Inventor: Hiroshi Goto, Yamatokoriyama, Japan

[73] Assignee: Omron Corporation, Kyoto, Japan

[21] Appl. No.: 75,292

[22] Filed: Jun. 11, 1993

Related U.S. Application Data

[62] Division of Ser. No. 741,353, Aug. 7, 1991, Pat. No. 5,245,463.

[30] Foreign Application Priority Data

| Aug. 7, 1990 | [JP] | Japan | 2-209803 |
| Aug. 7, 1990 | [JP] | Japan | 2-209804 |

[51] Int. Cl.⁶ ............................................. G02B 26/08
[52] U.S. Cl. ................................. 359/224; 359/114; 310/36; 347/257
[58] Field of Search ............... 359/196–202, 359/212–214, 221, 223, 224; 310/36–38, 320, 321, 323; 318/807, 808; 348/203, 205; 358/474, 296, 302; 346/108, 109, 160

[56] References Cited

U.S. PATENT DOCUMENTS

| 3,666,974 | 5/1972 | Dostal . | |
| 3,998,092 | 12/1976 | Maccabee | 359/224 |
| 4,213,146 | 7/1980 | Maiman | 310/36 |
| 4,732,440 | 3/1988 | Gadhok | 359/223 |
| 4,878,721 | 11/1989 | Paulsen | 359/224 |
| 4,902,083 | 2/1990 | Wells | 359/214 |
| 4,919,500 | 4/1990 | Paulsen | 359/214 |
| 5,079,641 | 1/1992 | Marino et al. | 359/224 |

FOREIGN PATENT DOCUMENTS

| 214863 | 3/1987 | European Pat. Off. . |
| 2640282 | 9/1978 | Germany . |
| 2075762 | 11/1981 | United Kingdom . |

*Primary Examiner*—Loha Ben
*Assistant Examiner*—James Phan
*Attorney, Agent, or Firm*—Dickstein, Shapiro & Morin

[57] ABSTRACT

An optical scanner and beam printer using the optical scanner are disclosed in which the optical scanner includes a scanning element supporting a mirror surface, a support element for freely supporting at one end the scanning element and at another end a vibrating element, and a drive source for inducing vibrations in the vibrating element. The support element may be a shaft having two modes of elastic deformation upon vibration or a torsional spring which undergoes deformation upon vibration. Vibrations received by the vibrating element are applied to the scanning element by the support element to cause optical scanning movement by the scanning element.

14 Claims, 5 Drawing Sheets

FIG.5
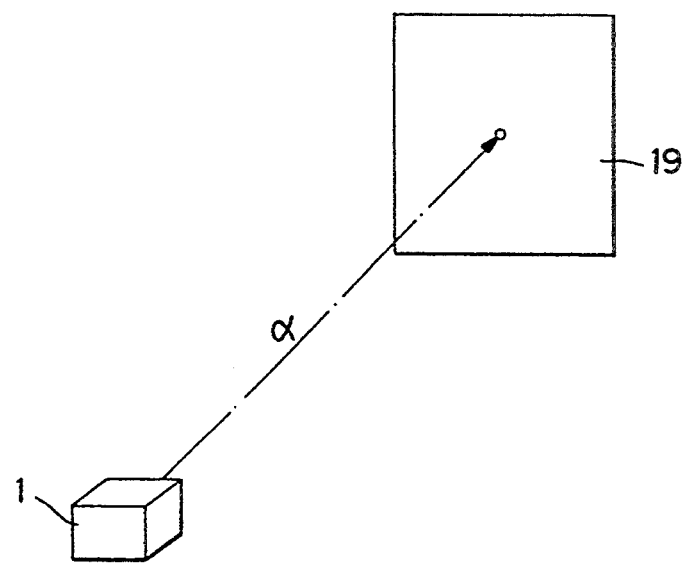
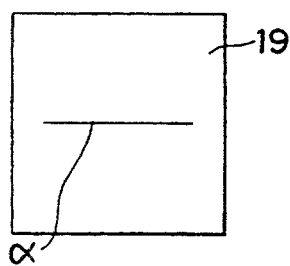
FIG.6(a)
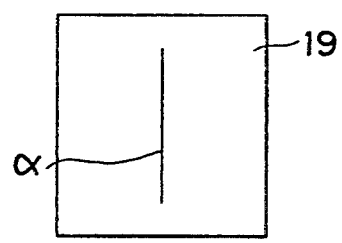
FIG.6(b)
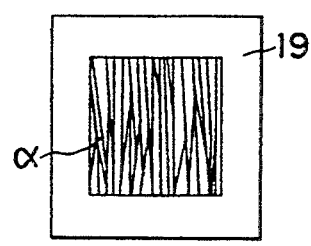
FIG.6(c)

OPTICAL SCANNER

This application is a division of application Ser. No. 07/741,353, filed Aug. 7, 1991, now U.S. Pat. No. 5,245,463.

(1) FIELD OF THE INVENTION.

This invention relates-to an optical scanner used, for example, in a laser printer or bar code reader, which causes a light beam to scan an area using a pattern of scan lines and to a light beam printer using the optical scanner.

(2) TECHNOLOGICAL BACKGROUND (A) Discussion of the Prior Art.

FIG. 10 shows the configuration of an existing optical scanner and a light beam printer using this scanner. The scanner uses polygonal mirror 31, which is in the shape of a regular polygon whose outer edges are coated with mirror surfaces 31a, 31a, etc. Polygonal mirror 31 is rotated at a fixed angular velocity by DC servomotor 32, which is controlled by driver circuit 35. Laser beam $\alpha$, emitted by semiconductor laser device 36, is focused by imaging lens 33 and projected onto one of the mirror surfaces 31a of polygonal mirror 31. When laser beam $\alpha$ is reflected off mirror surface 31a, it passes through beam scanning lens 34 and strikes the surface of, for example, a light sensitive drum 37. For a code reader, the drum 37 is replaced by a medium to be read and a focusing lens, not shown, is provided between the scanning lens 34 and read medium.

When polygonal mirror 31 is rotating at a fixed angular velocity, the angle at which laser beam $\alpha$ strikes mirror surface 31a will vary, and consequently the direction in which laser beam $\alpha$ is reflected will also vary. In this way the laser beam $\alpha$ can scan the surface of, for example, light-sensitive drum 37.

With this type of optical scanner, a polygonal mirror and a DC servomotor to drive its rotation are required. This has made it very difficult to reduce the size of the optical scanner, and it has placed a limit on how much size reduction is possible. Furthermore, in order to achieve precision in the width of the area scanned, the scanning speed and other scanning characteristics a high degree of accuracy is required in the dimensions of the mirror surfaces on the polygonal mirror, the angle at which each pair of surfaces meets, and so on. Accordingly, processing costs and the cost of assembly and adjustment are quite high and difficult to reduce. Another problem is that the angular range of scanning is fixed for each optical scanner, as the angle over which the laser beam scans is determined by the number of mirror surfaces. It is thus impossible to alter the angular range of scanning.

Furthermore, existing optical scanners are capable of scanning a laser beam in one direction only. A single scanner is incapable of switching between different directions of scanning or of scanning in two directions simultaneously.

(B) Summary of the Invention

In light of the faults of existing optical scanners which have been described above, the object of this invention is to provide a compact, economically priced optical scanner which is based on a new principle, and a light beam printer which employs this scanner.

In one embodiment of the invention, the optical scanner of this invention comprises a shaft capable of at least two modes of elastic deformation; a vibrating element provided on one end of the deformable shaft; a drive source for inducing oscillation in the vibrating element at a resonant frequency corresponding to each mode of elastic deformation of the shaft; a scanning element which can be caused to rotate in at least two directions by the elastic vibration of the deformable shaft, which scanning element is located on the opposite end of the deformable shaft, and is positioned in such a way that it can receive elastic vibrations in the shaft in at least one mode of deformation when oscillation is induced in the vibrating element; and a mirror surface on the scanning element.

The light beam printer of this invention comprises a source to generate a light beam; the optical scanner described in the preceding paragraph which reflects this light beam and causes it to scan; and a medium for receiving the scanning beam.

The operation of this first embodiment of the invention is briefly described as follows: Vibration of a resonant frequency corresponding to a specified mode of elastic deformation of the deformable shaft is applied to the vibrating element. The deformable shaft undergoes elastic vibration in the desired mode of elastic deformation, and the scanning element rotates in a specified direction. When a light beam strikes the mirror surface on the scanning element, the rotation of the scanning element causes the light beam reflected by the mirror surface to scan.

The deformable shaft has at least two modes of elastic deformation. When the drive frequency originating in the drive source is changed so as to alter the excitation mode, the direction in which the scanning element rotates will change. Thus, the direction in which the light beam scans can be changed. A single optical scanner, then, can be made to scan in at least two directions.

The scanning element, the deformable shaft and the vibrating element can all be made in the form of a flat plate, and a very small actuator, such as a piezoelectric or magnetostrictive vibrator, can be used as the drive source. Thus, the first embodiment optical scanner has enormous potential to be downsized. The structure of this first embodiment is uncomplicated, so the production cost as well as the assembly and adjustment cost will be low.

Furthermore, the amplitude of elastic vibration occurring in the deformable shaft (the angle of rotation of the scanning element) can be changed by causing the drive source to vary the amplitude at which the vibrating element oscillates. Thus it is possible to adjust the angle over which the light beam scans.

In a second embodiment of the invention, the optical scanner of this invention comprises a torsional spring to which torque can be applied; a scanning element attached to one end of the torsional spring, with its center of gravity being separated from the rotational axis of the torsional spring; a mirror surface on the scanning element; a vibrating element mounted on the other end of the torsional spring; and a drive unit to provide vibration to the vibrating element.

The operation of this second embodiment of the invention is briefly described as follows: The center of balance of the scanning element is distinct from that of the torsional spring, and thus the scanning element is unbalanced with respect to the center of balance of the torsional spring. When oscillation is induced in the vibrating element, torsional vibration is induced in the torsional spring, and the scanning element rotates. A light beam is directed to the mirror surface on the scanning element, and the rotation of the scanning element will cause the light beam reflected off the mirror to scan a surface.

The scanning element, the torsional spring and the vibrating element can all be made in the form of a flat plate, and a very small actuator, such as a piezoelectric or magnetostrictive actuator, can be used as the drive source. An optical scanner constructed using only these two types of materials has enormous potential to be downsized. The structure of the second embodiment optical scanner is also uncomplicated, so the production cost as well as the assembly and adjustment cost will also be low.

In addition, in the second embodiment the drive source can be used to change the amplitude at which the vibrating element oscillates. In this way the amplitude of the torsional vibration of the torsional spring (the angle of rotation of the scanning element) can be changed, and the angle over which the light beam scans can be adjusted.

The use of the first and second embodiments of optical scanners also makes it possible to produce compact economical code readers and light beam printers which operate at high speed.

The foregoing and other features and advantages of the invention will be more clearly understood from the following detailed description which is provided in connection with the accompanying drawings.

BRIEF DESCRIPTION OF THE DRAWINGS

FIG. 5 is a perspective view illustrating how the optical scanner of this invention can direct a laser beam onto a screen;

FIGS. 6(a), (b) and (c) show the traces made by a laser beam scanned across a screen in each of three modes;

DETAILED DESCRIPTION OF THE INVENTION

Figure 1:
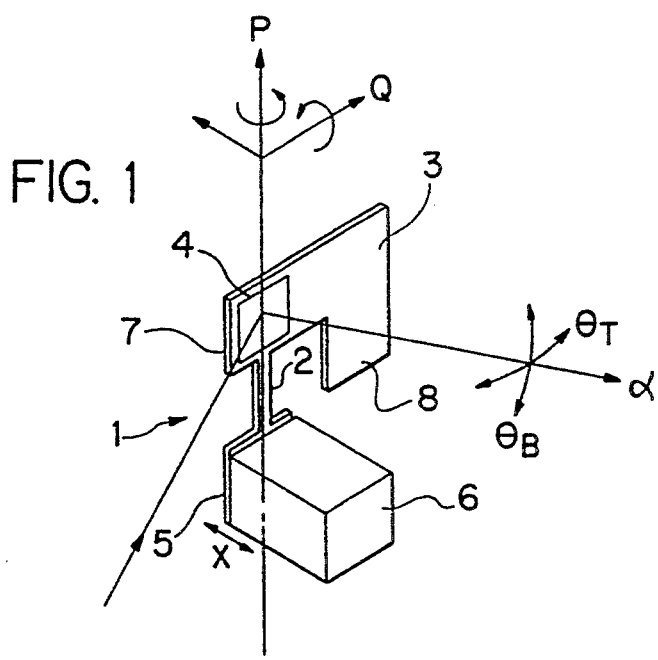
FIG. 1 is a perspective view of a first embodiment of this invention.
Figure 2:
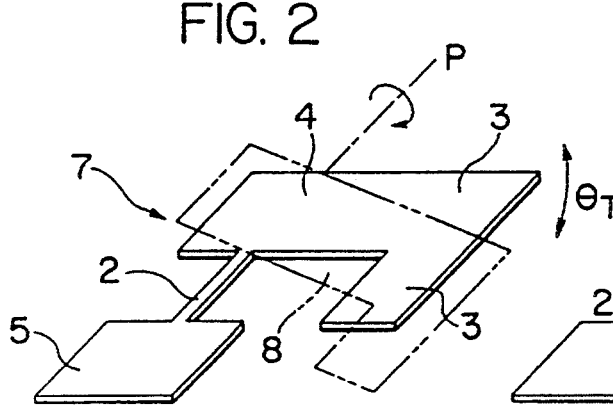
FIG. 2 is a perspective view of the plate in the same embodiment which shows its twisting mode.
Figure 3:
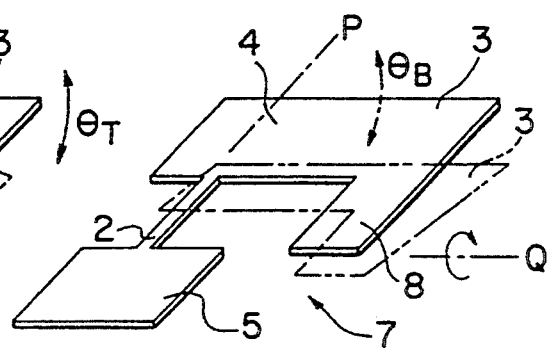
FIG. 3 is a perspective view of the same plate showing its bending mode.

FIG. 1 shows an example of a first embodiment of the invention. Optical scanner 1 is composed of a thin plate 7 and a small drive source 6, which induces infinitesimal vibration. Drive source 6 may be a piezoelectric or magnetostrictive actuator, or the like. The shape of plate 7 is illustrated in FIGS. 2 and 3. It includes a long and narrow deformable shaft 2 and its lower end widens to form vibrating element 5, which receives the oscillation produced by drive source 6. The upper end of plate 7 widens to form scanning element 3, which causes a laser beam to scan. Deformable shaft 2 has two modes of elastic deformation. One is the twisting mode, in which the shaft rotates with respect to its axis P, as shown in FIG. 2. The other is the bending mode, in which the shaft bends lengthwise along its axis P, as shown in FIG. 3. The elastic vibration occurring in the twisting mode has a resonant frequency of $f_T$, and that occurring in the bending mode has a resonant frequency of $f_B$. Scanning element 3 is formed in such a way as to be imbalanced with respect to the center of balance P of deformable shaft 2. To insure this imbalance, weight unit 8 has been added off-center from deformable shaft 2. A weight unit is also placed above the upper end of the shaft 2. Scanning element 3 has a mirror surface 4 to reflect a laser beam. This mirror surface may comprise the entirety of scanning element 3 or only a part of it. In the embodiment shown in FIG. 1, the mirror is provided in the vicinity of the center of the shaft P. Vibrating element 5 is glued or otherwise joined to the piezoelectric or magnetostrictive actuator or the like in drive source 6 and is thus fixed to the drive source. Scanning element 3 is freely supported by deformable shaft 2.

Plate 7 is produced by a microscopic process such as etching on a thin plate such as a silicon or glass wafer. These wafers have a smooth surface and excellent surface precision. It is thus possible to mass-produce an ultra-small plate. The mirror surface 4 of plate 7 can also be created by etching a silicon or other wafer. This is more economical than the conventional methods of producing a mirror.

Figure 7:
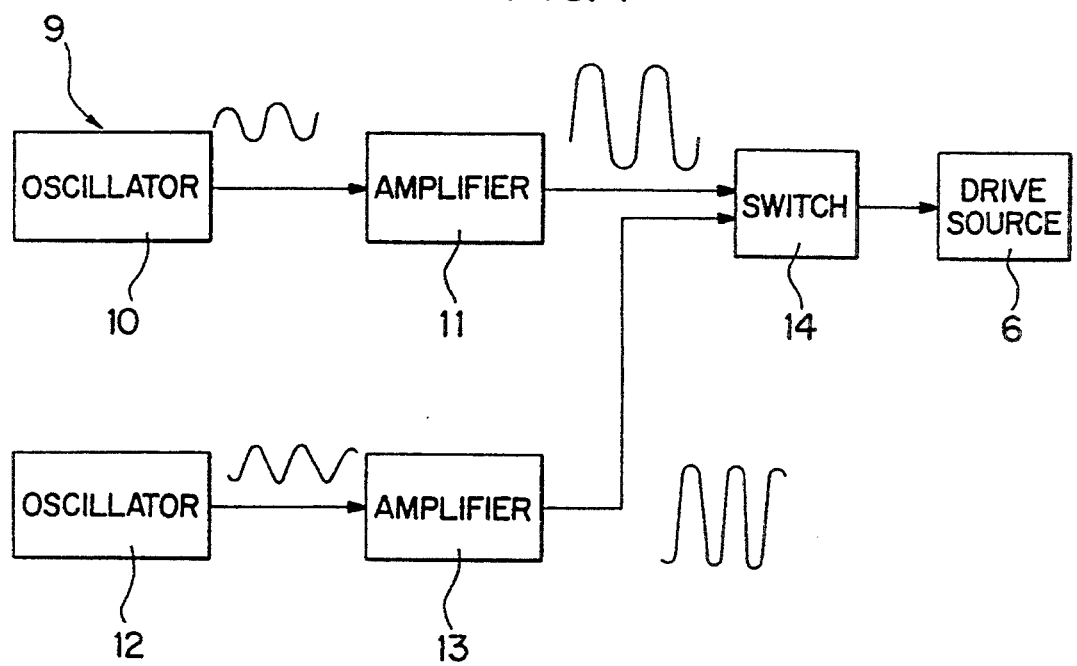
FIG. 7 is a block diagram of a drive circuit to power the drive source in the first embodiment.

Drive source 6, which employs a piezoelectric or magnetostrictive actuator, or the like, to induce high frequency vibration (for example, several hundred Hz) in vibrating element 5, is controlled by a drive circuit. This circuit excites vibration of resonant frequency $f_T$ in a twisting mode and vibration of resonant frequency $f_B$ in bending mode. FIG. 7 shows an example of a drive circuit 9. It comprises oscillator 10, which continuously outputs a voltage signal of a frequency matching the resonant frequency $f_T$ of the twisting mode; amplifier 11, which amplifies the voltage signal output by oscillator 10; oscillator 12, which continuously outputs a voltage signal of a frequency matching the resonant frequency $f_B$ of the bending mode; amplifier 13, which amplifies the voltage signal output by oscillator 12; and switch 14, which switches between the output voltage of frequency $f_T$ from amplifier 11 and the output voltage of frequency $f_B$ from amplifier 13, and applies one of these voltages to the actuatoral drive source 6. Alternatively, switch 14 can apply to the actuatoral drive source 6 a mixed signal having as components the voltage signal of frequency $f_T$ from amplifier 11 and that of frequency $f_B$ from amplifier 13. If switch 14 is placed between oscillators 10 and 12 and an amplifier, one amplifier can be made to serve both oscillators.

Figure 8:
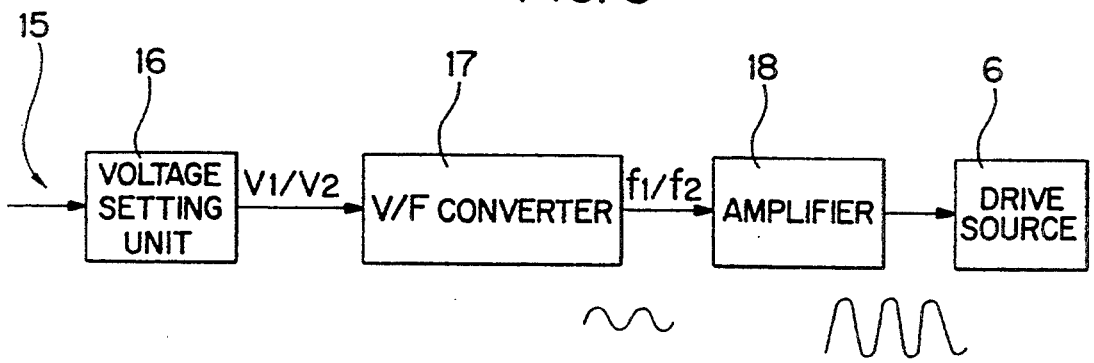
FIG. 8 is a block diagram of another example of a drive circuit to power the drive source in the first embodiment.

An alternative drive circuit 15, is depicted in FIG. 8. It comprises voltage setting unit 16, voltage/frequency converter 17 and amplifier 18. Voltage signal $V_1$ (or $V_2$) is output by voltage setting unit 16 based on a drive shaft command signal which is set at the operator's discretion. This voltage signal is converted to the corresponding signal of frequency $f_T$ (or $f_B$) by voltage/frequency converter 17, and the converted signal is amplified by amplifier 18. The signal of resonant frequency $f_T$ (or $f_B$) is then applied to drive source 6.

In FIGS. 7 and 8, the frequency signal is pictured as a sine wave. A rectangular or triangular wave can be used to yield the same result.

Figure 4:
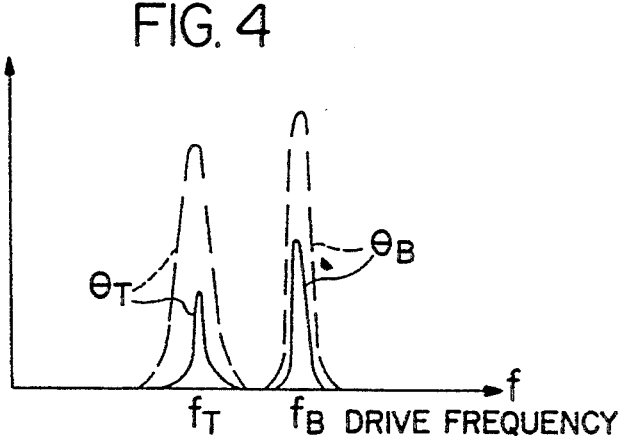
FIG. 4 is a graph which shows the relationship between the drive frequency and the angle of rotation of the scanning element.

The operation of the optical scanner 1 is now described. Drive source 6 is made to vibrate at a given frequency by the drive circuit, and this vibration is applied by the actuator of drive source 6 to vibrating element 5. This vibrating element will undergo reciprocating oscillation in direction x, as shown in FIG. 1. Inertia acts on scanning element 3 to cause shaft 2 to elastically deform and vibrate in the direction in which inertia is applied. Resonant frequency $f_T$, which characterizes the twisting mode, and resonant frequency $f_B$, which characterizes the bending mode, are determined by the modulus of elasticity, inertial moment, and other aspects of deformable shaft 2. When the drive frequency f which is applied to vibrating element 5 matches one of these resonant frequencies, elastic vibration of the given mode will be amplified in deformable shaft 2, and scanning element 3 will be driven over a large angle of rotation. The relationship between drive frequency f and angle of rotation $\Theta_T$ of scanning element 3, which obtains during twisting mode, or angle of rotation $\Theta_B$, which obtains during bending mode, is shown in FIG. 4. This graph shows the relationship between the drive frequency f of drive source 6 and the angle of rotation of scanning element 3 when the resonant frequency $f_T < f_B$. The horizontal axis is the drive frequency f, and the vertical axis is the angle of rotation $\Theta_T$ of the scanning element in a twisting mode or the angle of rotation $\Theta_B$ of the same unit in a bending mode. As can be seen, the angle of rotation $\Theta_T$, which obtains in a twisting mode, reaches its maximum when the drive frequency f is equal to The value of the angle drops off sharply on either side of the peak. The angle of rotation $\Theta_B$, which obtains in bending mode, reaches its maximum when the drive frequency f is equal to $f_B$ and drops off sharply on either side of the peak. Thus, even drive source 6, which is capable only of the infinitesimal vibration produced by a piezoelectric or magnetostrictive actuator, or the like, can cause mirror surface 4 to rotate over a large angle by producing drive vibration of the same frequency as the resonant vibration characterizing each mode of elastic deformation.

When vibrating element 5 is made to vibrate at resonant frequency $f_T$ in twisting mode, the twisting-type vibration is amplified in the deformable shaft, and scanning element 3 is made to rotate on its axis P over angle of rotation $\Theta_T$, as shown in FIG. 2. If at this time laser beam $\alpha$ is made to strike mirror surface 4 as shown in FIG. 1, the reflected laser beam $\alpha$ will scan over an angle of $2\Theta_T$, which is twice the angle of rotation $\Theta_T$ of scanning element 3. Thus, if laser beam $\alpha$, reflected off optical scanner 1, is made to strike screen 19 as shown in FIG. 5, it will scan to the left and right as shown in FIG. 6(a).

When vibrating element 5 is made to vibrate at resonant frequency $f_B$ in bending mode, the bending-type vibration is amplified in the deformable shaft, and scanning element 3 is made to rotate around an axis Q, orthogonal to its axis P, over an angle of rotation $\Theta_B$, as shown in FIG. 3. If at this time laser beam $\alpha$ is made to strike mirror surface 4, the reflected laser beam $\alpha$ will scan over an angle of $2\Theta_B$, which is twice the angle of rotation $\Theta_B$ of scanning element 3. Thus, if laser beam $\alpha$, reflected off optical scanner 1, is made to strike screen 19, it will scan up and down as shown in FIG. 6(b).

If vibrating element 5 is made to vibrate in a mode in which the two types of vibration are superposed, so that both resonant frequency $f_T$ of twisting mode and resonant frequency $f_B$ of bending mode are produced, both twisting and bending-type vibration will be amplified in deformable shaft 2, and scanning element 3 will be made to vibrate over angle of rotation $\Theta_T$ around axis P and over angle of rotation $\Theta_B$ around axis Q. When laser beam $\alpha$, reflected off scanning element 3, strikes screen 19, it will scan the entire surface, as shown in FIG. 6(c).

The voltage applied to drive source 6 can be adjusted while the drive frequency f which is applied by drive source 6 to vibrating element 5 is maintained at one of the possible resonant frequencies. In this way the amplitude x of the vibration of vibrating element 5 can be changed, and the angle of rotation $\Theta_T$ or $\Theta_B$ of scanning element 3 can be controlled. In FIG. 4, the dotted and solid lines show the amplitude of vibration of vibrating element 5, with the dotted line representing a greater amplitude. As the amplitude x of the vibration of vibrating element 5 increases, the angle of rotation $\Theta_T$ or $\Theta_B$ of scanning element 3 also increases.

Thus the user can select one of the two orthogonal directions of scanning available in this optical scanner by selecting one of the resonant frequencies as the drive frequency of drive source 6. The amplitude x of the vibration of vibrating element 5 can be adjusted by controlling the voltage applied to drive source 6. (Alternately, the drive frequency f can be infinitesimally varied.) In this way, the angle of scanning $2\Theta_T$ or $2\Theta_B$ can be controlled.

The optical scanner of this invention is not limited to the form of the embodiment described above. Various design changes are possible without departing from the spirit and scope of the invention. For example, in the embodiment described above, the surface of the scanning element was itself fashioned into a mirror. However, a discrete mirror could alternatively be attached to the surface of the scanning element. Furthermore, the materials used for the scanning element and mirror surface are not limited, the only criteria being that they be capable of performing the desired function. The silicon or glass wafer mentioned in the description of the first embodiment is not the only possible material for the scanning element. The drive source in the described embodiment uses as an actuator a piezoelectric or magnetostrictive actuator; however, any actuator capable of infinitesimal vibration at high speed may be used. One might, for example, use an actuator which produces infinitesimal vibration through the use of static electricity. The plate shown in FIGS. 1-3 is one example of how the optical scanner 1 might be formed. Any form is acceptable which renders the scanner capable of at least two modes of elastic deformation. In the embodiment described above, the two resonant frequencies $f_T$ and $f_B$ have two different values. These resonant frequencies can be set at the user's discretion by selecting values for the modulus of elasticity and inertial moment of the deformable shaft, by selecting the shape of the plate, and so on. The resonant frequencies $f_T$ and $f_B$ may have the same value.

Figure 9:
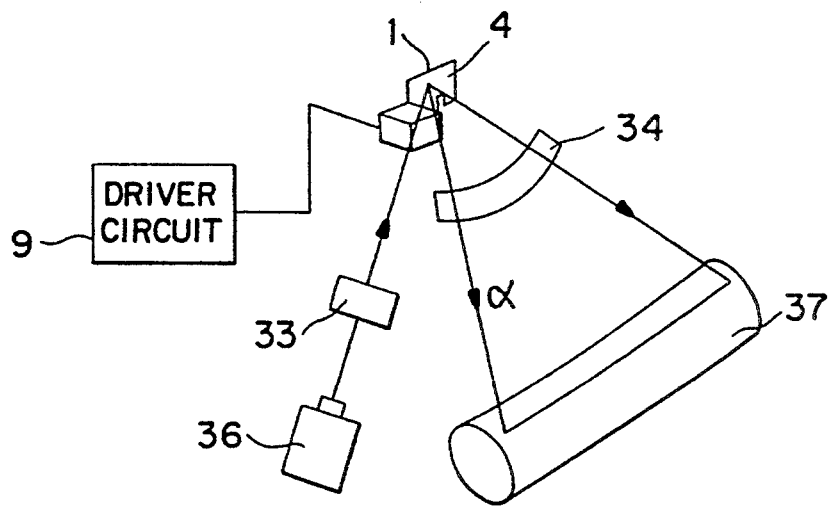
FIG. 9 is a perspective view of a light beam printer which uses the optical scanner of the first embodiment.
Figure 10:
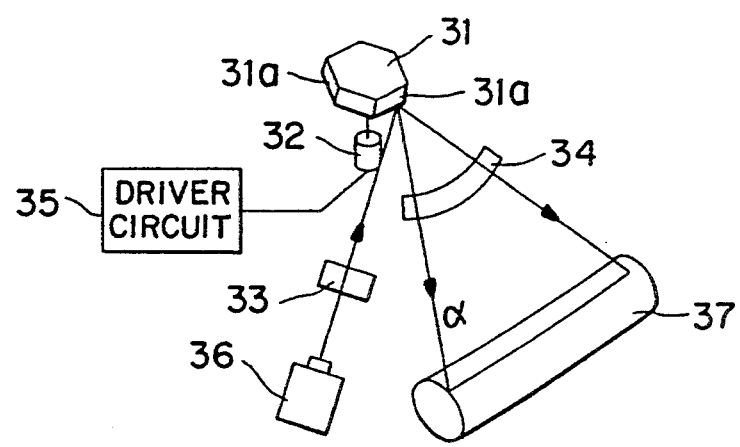
FIG. 10 is a perspective view of an example of an existing optical scanner.

FIG. 9 is an oblique view of a rough sketch of a light beam printer which uses the optical scanner described above. This light beam printer comprises the optical scanner 1; semiconductor laser device 36, which causes laser beam α to strike mirror surface 4 on optical scanner 1; imaging lens 33; beam scanning lens 34; and light sensitive drum 37.

Laser beam α, which is emitted by semiconductor laser device 36, is focused by imaging lens 33 and made to strike mirror surface 4 on optical scanner 1. When laser beam α is reflected off mirror surface 4, it passes through beam scanning lens 34 and strikes the surface of light sensitive drum 37. When mirror surface 4 on optical scanner 1 rotates, laser beam α, reflected by optical scanner 1, scans the surface of light sensitive drum 37 and forms latent images on this surface.

The first embodiment of the invention makes it possible to provide an optical scanner which operates according to a novel principle. That is, the oscillation induced by a piezoelectric or magnetostrictive actuator, or the like, induces vibrations in a vibrating element, which is converted by means of a deformable shaft, into the rotational movement of a scanning element. When a light beam is made to strike a mirror surface on the scanning element, the reflected light beam is made to scan.

The deformable shaft has at least two modes of elastic deformation. If the vibrating element is excited at a frequency which is the resonant frequency of one of these modes, the deformable shaft will undergo elastic deformation in that mode. By choosing one mode or the other, one can change the direction in which the scanning element rotates. It is also possible to fabricate an optical scanner with more than two axes of scanning so that a single scanner could cause a light beam to scan in more than two directions.

It is thus possible to produce an ultra-compact optical scanner which is economically priced.

The angle over which the scanning element rotates can be changed by adjusting the amplitude of vibration of the vibrating element. Thus the light beam of a single scanner can be made to scan over whatever angle is desired.

Although FIG. 9 shows the scanner of the first embodiment used in a light beam printer, the scanner may also be used in a code reader in which case the light sensitive drum is replaced by a readable medium. In this case, a focusing lens may be provided between the beam scanning lens 34 and readable medium.

Figure 11:
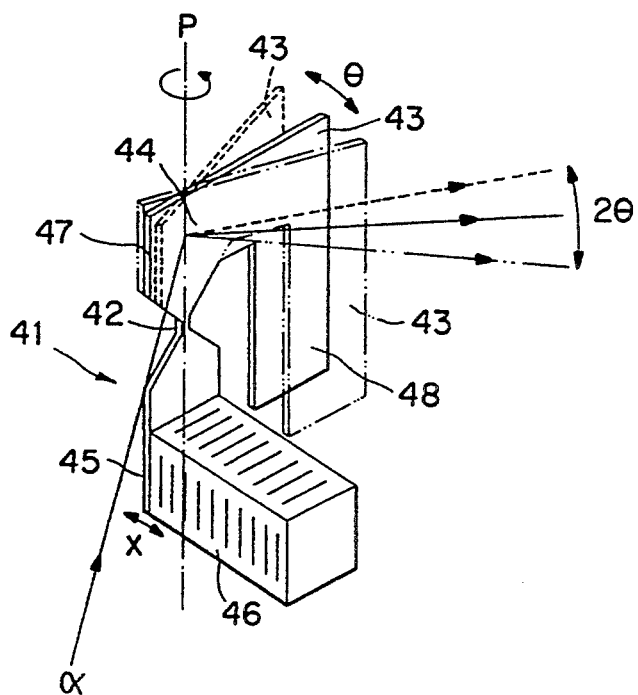
FIG. 11 is a perspective view of a second embodiment of this invention.
Figure 12:
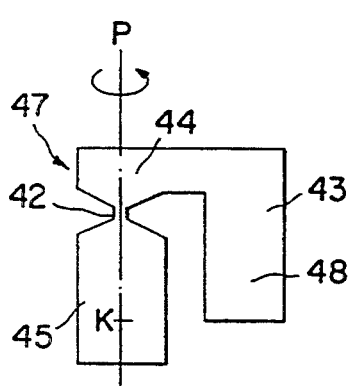
FIG. 12 is a front view of the plate in the same embodiment.
Figure 13:
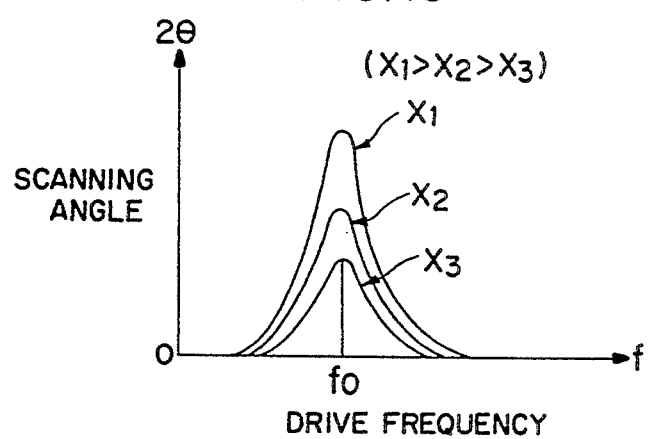
FIG. 13 is a graph which shows the relationship between the drive frequency and the scanning angle of the light beam in the same embodiment.

A second embodiment optical scanner will now be described with reference to FIGS. 11-13. This embodiment uses a torsional spring to move a scanning element. Optical scanner 41 is composed of a thin plate 47 and a small drive source 46, which induces infinitesimal vibration by a piezoelectric or magnetostrictive actuator, or the like. The shape of plate 47 is illustrated in Figure 12.

Torsional spring 42 is made sufficiently narrow as to permit torsion (elastic) deformation. On one side of torsional spring 42 is vibrating element 45, which applies the oscillation produced by drive source 46. On the other side is scanning element 43, which causes a beam of light to scan a surface. Torsional spring 42, vibrating element 45 and scanning element 43 are formed from a single plate. Scanning element 43 is formed in such a way as to be imbalanced with respect to the center of balance P of torsional spring 42. To insure this imbalance, weight unit 48 has been added off-center from torsional spring 42. As a result, the center of balance of scanning element 3 is separate from the center P of torsional spring 42.

Scanning element 43 has a mirror surface 44 to reflect a laser beam. This mirror surface may comprise the entirety of scanning element 43 or only a part of it. In the embodiment shown in FIG. 11, the mirror is provided in the vicinity of the rotational axis of the torsional spring P. Vibrating element 45 is glued or otherwise joined to the piezoelectric or magnetostrictive actuator, or the like in drive source 46. High frequency oscillation is induced by drive source 46 at point K on the axis P of torsional spring 42. Thus actuating element 45 is fixed to drive source 46, and scanning element 43 is freely supported by torsional spring 42.

The plate 47 is produced by a microscopic process such as etching on a thin plate such as a silicon or glass wafer. These wafers have a smooth surface and excellent surface precision. It is thus possible to mass-produce an ultra-small plate. The mirror surface 44 of plate 47 can also be created by etching a silicon or other wafer. This is more economical than the conventional method of producing a mirror.

Scanning element 43 is supported by torsional spring 42, which is capable of torsional deformation. The scanning element has a different center of balance from the axis P of torsional spring 42. When high frequency oscillation of frequency f is induced in vibrating element 45 by a piezoelectric or magnetostrictive actuator, or the like driven by drive source 46, the vibrating element is made to undergo reciprocating oscillation in direction x, as shown in FIG. 11. Inertia acts on scanning element 43 to create rotational movement in torsional spring 42. This torsional spring torsionally deforms around its axis P, and scanning element 3 undergoes reciprocating rotation around axis P. Vibrating element 5 is made to oscillate at drive frequency f, which is identical to the characteristic oscillating frequency $f_0$ at which torsional spring 42 torsionally deforms. When unit 45 oscillates, torsional spring 42 undergoes resonant vibration relative to the torsion, the angular rotation of scanning element 43 is amplified, and angle of rotation Θ reaches its maximum value. Thus mirror surface 44 can be made to rotate over a large angle even though drive unit 46 is capable of only the infinitesimal vibration provided by a piezoelectric or magnetostrictive actuator or the like. Consequently, if laser beam α is made to strike mirror surface 44, the reflected laser beam α will scan in a line which has a scanning angle twice that of the rotational angle Θ of scanning element 43, or 2Θ.

The characteristic oscillating frequency $f_0$ of torsional spring 42 can be determined by the formula $$f_0 = \frac{1}{2\pi} \sqrt{\frac{G_P}{I_P}}$$

where $G_P$ is the torsional rigidity of torsional spring 42 and $I_P$ is the rotational inertial moment of scanning element 43 with respect to axis P. When vibrating element 45 is caused to oscillate at drive frequency f, which is equal to $f_0$, scanning element 43 will rotate over its maximum angle of rotation. The maximum value of the angle of rotation Θ of scanning element 43 (which provides for the laser beam a scanning angle of 2Θ) is determined by the torsional rigidity $G_P$ of torsional spring 42; the rotational inertial moment $I_P$ of scanning element 43; and the drive frequency f and amplitude (driving force) x of vibrating element 45. The drive frequency f applied to vibrating element 45 by drive source 46 can be maintained at a fixed value $f_0$ while the voltage applied to drive source 46 is adjusted. In this way, the amplitude x with which vibrating element 45 oscillates can be varied, and through this variation the rotational angle Θ of scanning element 43 and the scanning angle 2Θ of laser beam α can be controlled. FIG. 13 illustrates how this works. The vertical axis is the scanning angle 2Θ of laser beam α; the horizontal axis is the drive frequency f of vibrating element 45. Characteristics are shown for three amplitudes $x_1$, $x_2$ and $x_3$ of the oscillation of unit 45, such that $x_1 > x_2 > x_3$. Angle of scanning 2Θ reaches its maximum value when drive frequency f is equal to characteristic oscillating frequency $f_0$. It increases if the amplitude of the oscillation occurring in vibrating element 45 is increased. Thus the operating principle of optical scanner 41 is as follows: a drive frequency f is used which is virtually identical to the characteristic oscillating frequency $f_0$ of torsional spring 42. By controlling the voltage applied to drive source 46 (or by varying the drive frequency f infinitesimally), one can adjust the amplitude x of the oscillation of unit 45. In this way one can control the angle of scanning 2Θ.

In the second embodiment described above, the surface of the scanning element 43 was itself fashioned into a mirror. However, a discrete mirror may be attached to the surface of the scanning element 43. Furthermore, the materials used for the scanning element and mirror surface are limited only in that they must be capable of performing the desired function. The silicon or glass wafer described above is not the only possible material. The drive source 46 used as an actuator a piezoelectric or magnetostrictive actuator; however, any actuator capable of infinitesimal vibration at high speed may be used. As in the first embodiment, one might, for example, use an actuator which produces infinitesimal vibration through the use of static electricity.

This second embodiment of the invention provides an optical scanner which operates according to a novel principle. The oscillation of a drive source such as a piezoelectric or magnetostrictive actuator or the like can apply a torque to a torsional spring in order to induce rotational movement of a scanning element. If a beam of light is directed at the mirror surface of this scanning element, the beam reflected off this mirror surface can scan in a straight line.

This second embodiment also allows an ultra-miniature optical scanner to be produced at an economical cost.

By adjusting the amplitude at which the vibrating element of the second embodiment oscillates, one can change the angle of rotation of the scanning element. Thus a single optical scanner can be made to emit a beam of light over whatever angle of scanning is desired.

This second embodiment of the invention may, like the first, be used in a laser printer in a configuration similar to that shown in FIG. 9. Like the first embodiment, it may also be used as a code or other image scanner.

Although various embodiments of the invention have been described and illustrated, the invention is not so limited, as various modifications can be made within the spirit and scope of the invention. Accordingly, the invention is not to be considered as limited by the description and drawings.

I claim:

1. An optical device for creating an image on a medium comprising:

an optical light source providing a writing light beam;

a medium for receiving said writing light beam to create an image; and an optical scanner for causing said writing light beam from said light source to be scanned on said medium, said optical scanner comprising:

a scanning element;

a support element for freely supporting at one end thereof said scanning element, said support element being a flexure element;

a vibrating element provided on another end of said support element; and a drive source for inducing oscillation in said vibrating element, whereby vibration of said vibrating element produces deformation of said support element and consequent scanning movement of said scanning element, wherein said support element is a shaft having at least two modes of elastic deformation and said drive source induces oscillations in said vibrating element of a resonant frequency corresponding to each mode of elastic deformation of said shaft, said scanning element being rotated in at least two directions by the elastic vibrations of said shaft, and wherein said vibrating element, shaft and scanning element are integrally formed as a flat plate-like member.

2. An optical device as in claim 1, wherein said drive source comprises means for generating a plurality of oscillating frequencies, means for selecting at least one of said frequencies, and an actuator connected to receive the selected frequencies for vibrating said vibrating element at said selected frequencies.

3. An optical device as in claim 2, wherein said drive source further comprises means for altering the amplitude of the selected frequencies.

4. An optical device as in claim 1, wherein said scanning element includes a weight to provide said scanning element with an imbalance with respect to a center of balance of said deformable shaft.

5. An optical device as in claim 1, wherein said at least two modes of elastic deformation include a twisting mode about said shaft axis and a bending mode in which said shaft bends lengthwise along its axis.

6. An optical device as in claim 5, wherein said drive source comprises a first oscillator which outputs a signal of a first frequency substantially equal to a resonant frequency of said twisting mode;

a second oscillator which outputs a signal of a second frequency substantially equal to a resonant frequency of said bending mode;

means for amplifying the output of said first and second oscillators;

means for selecting at least one amplified output of at least one of said oscillators; and an actuator for receiving the at least one amplified output from the selecting means, said actuator vibrating said vibrating element.

7. An optical device as in claim 6, wherein said actuator is selected from the group consisting of a piezoelectric element, an electrostatic element, and a magnetostrictive element.

8. An optical device as in claim 7, wherein said selecting means is capable of selecting amplified outputs from both of said oscillators which are applied to said actuator.

9. An optical device as in claim 6, wherein said amplifying means is a variable gain amplifying means.

10. An optical device as in claim 5, wherein said drive source comprises:
- a voltage setting unit for setting a voltage to select a desired vibration frequency, said desired vibration frequency being one which is substantially equal to at least one of a resonant frequency of said twisting mode and a resonant frequency of said bending mode;
- a voltage to frequency converter connected to an output of said voltage setting unit;
- an amplifier connected to an output of said converter; and,
- an actuator connected to an output of said amplifier, said actuator vibrating said vibrating element.

11. An optical device as in claim 10, wherein said amplifier is a variable gain amplifier.

12. An optical device as in claim 1, wherein said flat plate-like member is a thin plate formed from at least one of a silicon and a glass wafer.

13. An optical device as in claim 12, wherein said thin plate is etched to provide a mirror surface as the scanning element.

14. An optical device as in claim 1, wherein said drive source includes, as an actuator for inducing vibrations in said vibrating element, at least one of a piezoelectric element, an electrostatic element and a magnetostrictive element.

* * * * *